United States Patent [19]

Brazil

[11] 4,432,390
[45] Feb. 21, 1984

[54] REMOTELY ADJUSTABLE CONTROL PRESSURE BY-PASS AND SHUT-OFF VALVE

[76] Inventor: Eugene L. Brazil, P.O. Box 505, Corcoran, Calif. 93212

[21] Appl. No.: 308,612

[22] Filed: Oct. 5, 1981

[51] Int. Cl.³ .......... F16K 31/52; F16K 3/32; F16C 1/10
[52] U.S. Cl. .............. 137/625.46; 251/288; 251/294; 74/501 R; 74/526
[58] Field of Search ........ 251/294, 285, 288; 74/501, 526; 137/625.46

[56] References Cited
U.S. PATENT DOCUMENTS 1,267,130  5/1918  Skeith et al. .............. 251/294 X
2,997,273  8/1961  Nilsen .................... 251/185
3,813,080  5/1974  Rogers ................... 251/285
3,954,250  5/1976  Grace .................... 251/294 X

FOREIGN PATENT DOCUMENTS 526928  7/1921  France .................... 251/294

Primary Examiner—Arnold Rosenthal
Attorney, Agent, or Firm—William H. Maxwell

[57] ABSTRACT

A fluid delivery control in agricultural crop spraying vehicles and the like for precise preset return to an adjusted open positioning of a by-pass and shut-off valve remote from the driver platform, cab and seat, whereby variation in engine-pump speed is compensated for and fluid spray adjusted while operating the vehicle.

8 Claims, 6 Drawing Figures

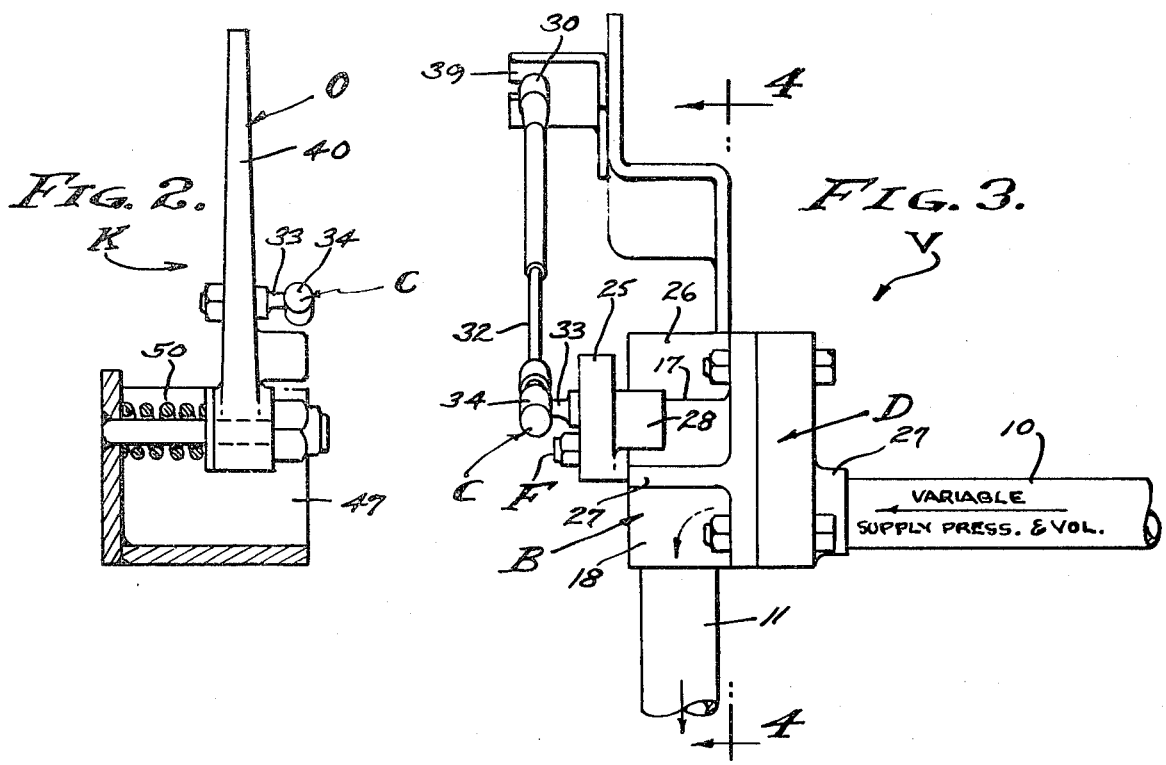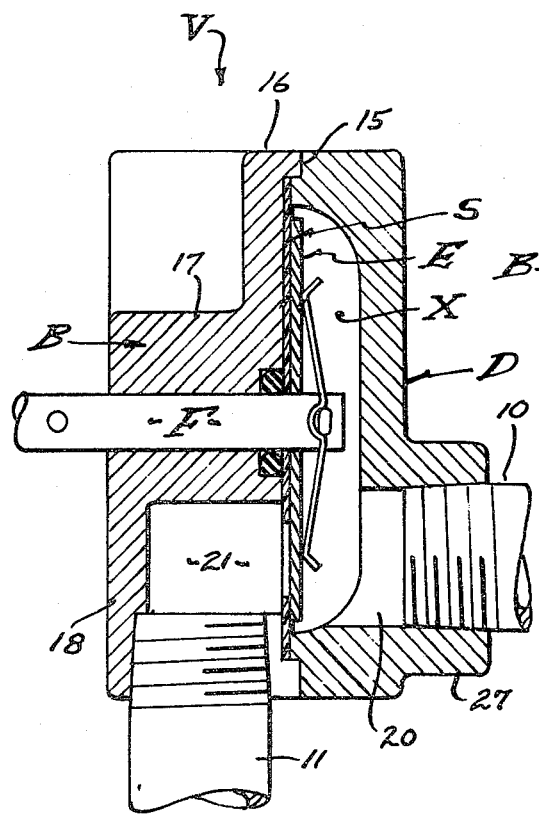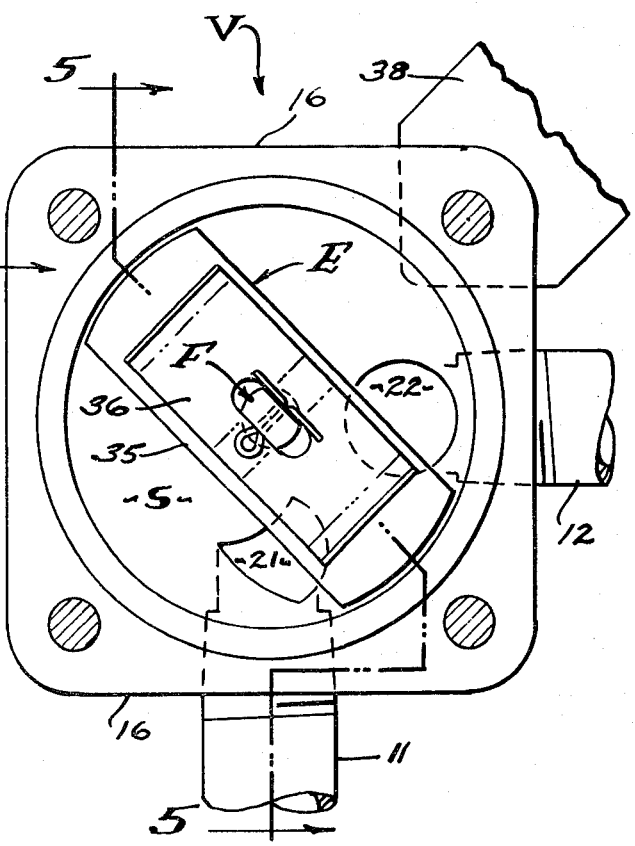

REMOTELY ADJUSTABLE CONTROL PRESSURE BY-PASS AND SHUT-OFF VALVE

BACKGROUND

This invention is concerned with the pressure regulation and delivery of hydraulic fluids, and particularly to agricultural applications such as for the control of crop spraying equipment. Crop control with liquid sprays is widely used, the liquid being used as the carrier of chemicals for insect control, fertilization and defoliation etc. It is the precisely adjusted delivery of liquid spray material to spray bars (not shown) which is a general object of this invention, and specifically it is the remote adjustment of a by-pass and shut-off valve for the control of said delivery.

Chemical application to crops is most often by means of spray application from vehicles traversing the fields thereof. The vehicle (not shown) usually a tractor or the like, carries or draws a supply tank of liquid chemical, and the prime mover thereof drives a positive displacement or like pump that supplies fluid under pressure to a delivery line 10. It is common practice to employ an adjustable valve V having an outlet line 11 to the spray bars, and having a by-pass line 12 returning to the supply tank or pump inlet. It is of course most practical to locate the valve V in the direct line 10–11 to the spray bars, however such an installation is invariably within the complexities of the power transmission and undercarriage of the vehicle and consequently remote and inaccessible to the person operating the vehicle from the conventional driver platform, cab and seat. As a result, pre-adjustment of the valve V has been a requirement and in reality unsatisfactory, since variation in engine speed of the vehicle will adversely affect the delivery of fluid to the spray bars, as a result of the orifice effect of the nozzles that determines the volume of spray and pressure thereof. It is therefore an object of this invention to provide a remotely adjustable control for pressure-volume by-pass and shut-off valves of the type under consideration, whereby a vehicle driver can adjust or close fluid delivery to the spray bars while driving, in order to compensate for changes in engine-pump speed of the vehicle operation, all as circumstances require according to the particular crop needs.

The by-pass valve as it is disclosed herein is an improvement over the Fluid Handling Valve which is the subject of U.S. Pat. No. 2,997,273 issued Aug. 22, 1961 to Norman P. Nilsen. Said prior art valve was not intended, at that time, to be infinitely adjustable as it was operated by a ratchet control into fully opened and closed positions so as to alternately open outlet and by-pass lines. More recently it has been the practice to alternately adjust the outlet and by-pass ports of such a valve in order to obtain precise spray volume adjusted to engine-pump speed of vehicle operation. In carrying out the adjustment, the by-pass port is gradually closed as the outlet port is gradually opened; and the said outlet port is shaped so as to increase from an initially miniscule flow volume. These are the characteristics of the by-pass valve with which this invention is concerned, for its remote control and precise determination of chemical spray delivery and/or shut-off.

SUMMARY OF THE INVENTION

This invention relates to the precise flow control of hydraulic fluid subject to variations in supply pressure and volume. The by-pass valve V for this purpose is remote from the control therefor, the invention providing for precise positioning of a valve element in response to a manually positionable lever remote from the valve V. A feature is the removal of adjustment means from the valve per se and replacement thereof in a control means K coupled to the valve V by means of a push-pull cable C. The adjustment is a limiting control that can be preset from time to time at the driver's platform, cab and seat of the vehicle; rather than pre-set from within the complexities of the vehicle mechanism.

The foregoing and other various objects and features of this invention will be apparent and fully understood from the following detailed description of the typical preferred form and application thereof, throughout which description reference is made to the accompanying drawings.

DESCRIPTION OF THE DRAWINGS

FIG. 2 is a sectional view of the control means taken as indicated by line 2—2 on FIG. 1.

FIG. 3 is an elevational view of the by-pass valve taken as indicated by line 3—3 on FIG. 1.

FIG. 4 is an enlarged sectional view taken as indicated by line 4—4 on FIG. 3.

Figure 1:
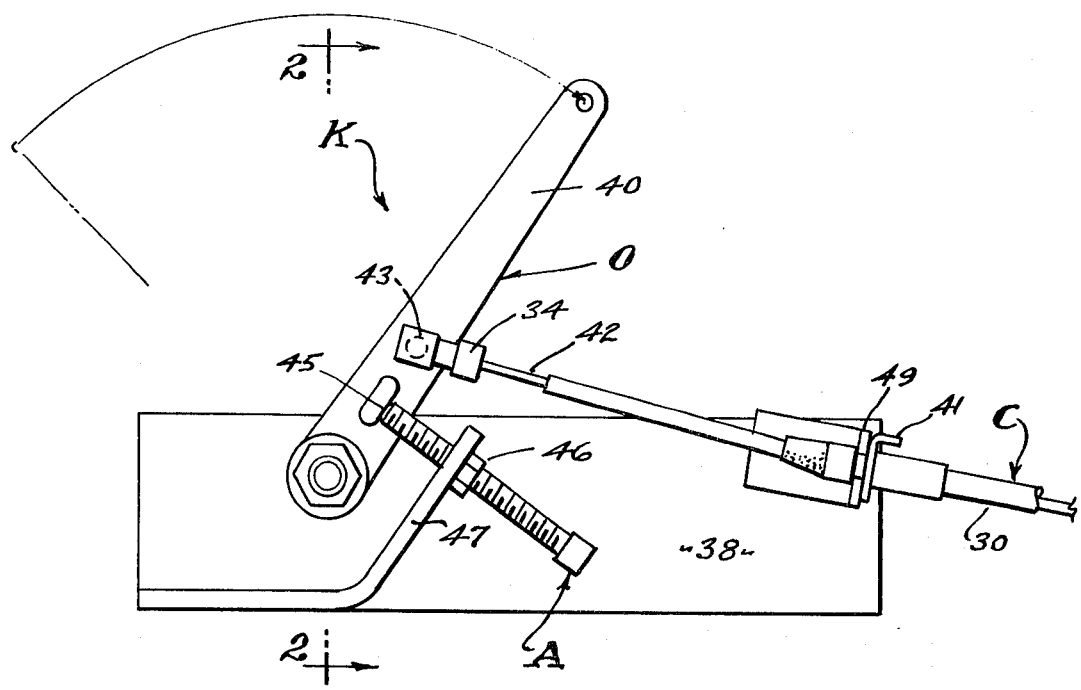
FIG. 1 is an exploded view showing the control means K and by-pass valve in elevation.
Figure 1:
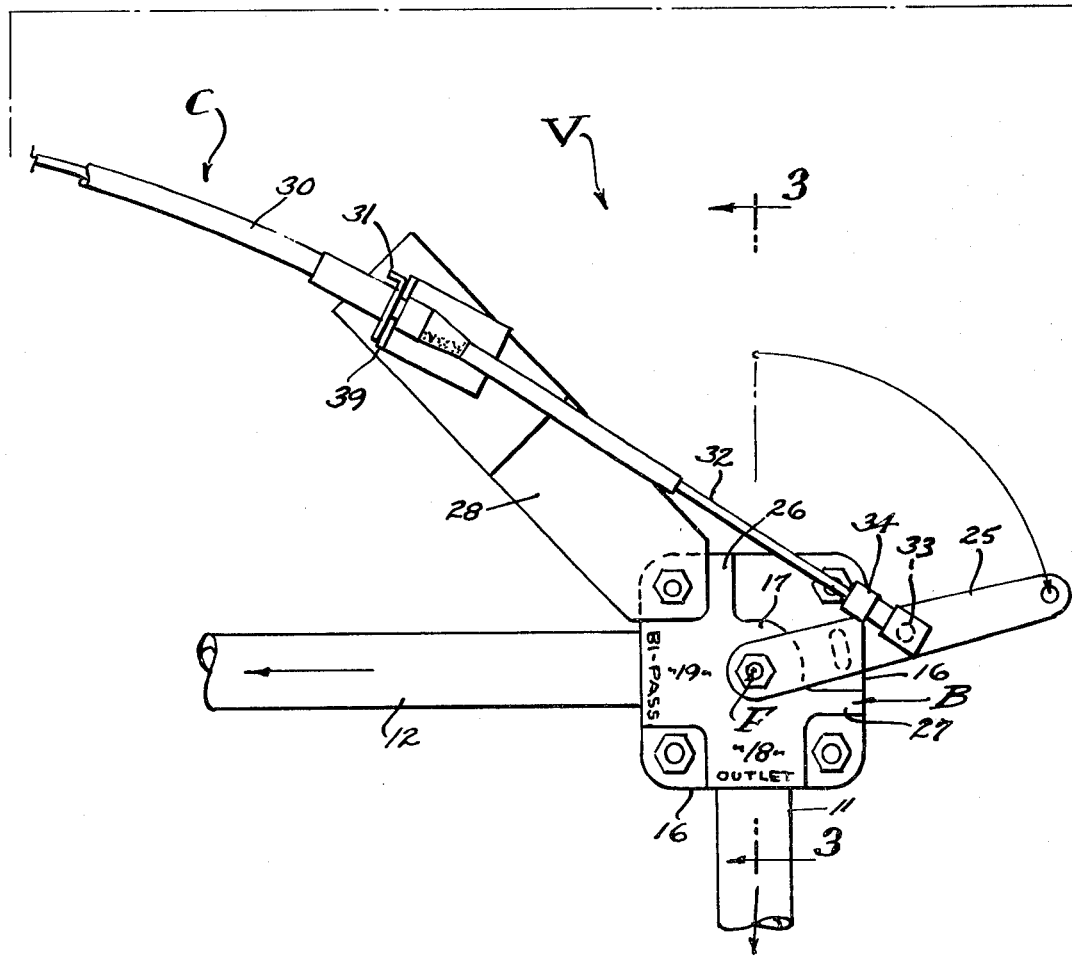

And, FIG. 5 is a sectional view taken as indicated by line 5—5 on FIG. 4.

PREFERRED EMBODIMENT

Referring now to the drawings, there is a by-pass and shut-off valve V coupled to the control means K by push-pull cable means C. As hereinafter described, the valve V is characterized by a valve element E that has limited angular movement associated with a corresponding angular displacement of outlet and by-pass ports 21 and 22. In practice, the angular displacement is 90° for a full open position of the outlet port 21 when the by-pass port 22 is fully closed, and vice versa. Accordingly, the control means K has an operating means O having a corresponding displacement capability with adjustment means A incorporated therein to substantially restrict opening of port 21 with commensurately simultaneous closing of port 22. The push-pull cable means C couples the valve V and control means K substantially without slack or play.

The fluid handling by-pass and shut-off valve V is adapted to control the supply of fluid under variable pressure and potential volume from the inlet line 10 and port 20, and to direct flow to the alternately opened-closed ports 21 and 22. This valve handles flow in one direction from line 10 into a chamber X and therefrom through either line 11 or 12 and/or both. There is a valve body B and a cover D overlying a portion of the body and establishing the chamber X, a seat S carried by the body and having the ports 21 and 22 therethrough, a valve element E cooperatively engaged with the seat, and an operating stem F for shifting the valve element E.

The valve body B is a flat plate-like element with a flat inner face 15 and is of rectangular configuration having like sides 16.

The valve element E is rotated by turning of the stem F through 90° of angular displacement and on a central axis that extends through the valve normal to the plane of face 15. A central boss 17 projects to form the exterior of the body B to carry the stem, laterally enlarged at 18 and 19 to receive the lines 11 and 12 that are threadedly engaged therethrough. The enlargements 18 and 19 are angularly disposed 90° apart and open into the chamber X through the correspondingly positioned ports 21 and 22 continuing through the seat S later described. The ports are spaced radially from the said axis of the valve.

The face 15 of the valve body B is recessed to receive the seat S comprised of a disc-shaped sheet of "Teflon" or tetraflouroethylene as manufactured by DuPont de Nemours or like plastic material having the two ports formed therethrough, and also a central opening for the stem F. As shown, the stem F projects into the chamber X with a flattened end portion to turn the valve element E and extends through the boss 17 to the exterior thereof to carry a lever 25. The lever 25 moves between alternate positions extending diametrically opposite from the boss enlargements 18 and 19, and stopped thereby by ears 26 and 27 engageable with a lug 28 on the lever.

Outlet port 21 is of unique configuration, while the by-pass port 22 is the full diameter of the line 12 passage into which it discharges in proportion as it is uncovered by the valve element E. Said valve element E is a flat plate 35 that is shiftably carried within the chamber X to alternately cover and uncover the port 21 and 22. The plate 35 slides with little restriction upon the seat S of "Teflon", being biased thereagainst by a leaf spring 36 secured by a cotter. As shown, the valve element plate 35 turns with the flattened end of the stem F. The outlet port 21 is of convergent shape toward the closure side thereof, where the vertex of opposite sides thereof is closed off following gradual diminishing flow.

The cover D overlies a portion of the body B to close the chamber X, and is a flat plate like body B and with a boss 27 aligned with the aforesaid outlet boss 18 and into which the inlet line 10 is threadedly engaged. It is significant that the bosses 18 and 27 are axially aligned for flow continuity of the useable fluid transported through the chamber X, the useable fluid being diverted laterally through the by-pass port 22 and line 12.

Projecting diagonally from one corner of the body B, opposite from and bisecting the angular displacement of the lever 25 there is an arm 38 that carries an anchor to which the cable means C is secured. As shown, the casing 30 of the cable means C is channeled so as to engage in the notched anchor 39 and secured by a latch 31, all of conventional construction. The cable casing 30' carries a free reciprocable element, the end of which is a rod 32 releasably connected to a ball member 33 on the lever 25 by means of a conventional coupler 34. Accordingly, the rod 32 is operable to move with the lever 25 through a full 90° of angular displacement, without restriction (no adjustment) of the valve V.

Referring now to the control means K, the lever 25 of the valve is duplicated in a manually operable lever 40 that positions the reciprocable element of the cable means C. As shown, the control means K comprises a bearing plate 38 that carries the lever 40, a friction spring 50 and an anchor 49 to which the cable means C is secured. The bearing plate 38 rotatably carries the lever 40 so that it is shiftable throughout an angular displacement of 90° and against a stop 45. The casing 30 of the cable means C is channeled so as to engage in the notched anchor 49 and secured by a latch 41, all of conventional construction. The cable casing 30 carries the freely reciprocable element, the end of which is a rod 42 releasably connected to a ball member 43 on the lever 40 by means of a conventional coupler 44. Accordingly, the rod 42 is operable to shift the lever 40 through a full 90° of angular displacement, to be restricted only by the stop 45 that comprises a screw and lock nut 46 therefor, threadedly engaged through a flange 47 on the bearing plate 38 to oppose movement of the lever 40 into the outlet opening position.

From the foregoing it will be become apparent that I have provided a highly utilitarian control for the adjustment of a by-pass and shut-off valve, whereby a balance between useable and return liquid is established despite variations in pressure-volume from a supply of said liquid. When positive displacement or like pumps are employed it is quite necessary to by pass fluid that is not sprayed, while changes in speed of vehicle-pump operation must be compensated for. The disposition of the lines 10-11 installation is of extreme importance, to avoid complexity, to provide for efficiency, and to exclude fluids that are often toxic from the drivers platform, cab or seat. The disposition of the control means K is not restricted by the disposition of the by-pass and shut-off valve V, in that the cable means C is readily trained into most any angular relationship of means K and valve V. It is the control means K which is adjusted through direct manipulation, whereby the by-pass and shut-off valve V responds exactly without delay and without discrepancy. Accordingly, the vehicle driver can now make changes while in motion, all as circumstances require, to either augment or diminish fluid flow with fine adjustments thereto dependant upon variations in vehicle-pump speed of operation or to shut off flow.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. The combination of a by-pass and shut-off valve and remote adjustable control means therefor for use where the supply of fluid varies with respect to pressure-volume;

the by-pass valve including a chamber with an operating stem entering therein and rotatable freely between opened and closed positions, and with an inlet port from a variable pressure-volume supply line, and with separate outlet and by-pass ports angularly separated about the stem, the outlet port being convergent toward its closure side and with a vertex for gradually diminishing flow and opening to a useful fluid line, and the by-pass port being open to a return line, and a valve element positioned by the stem rotated by a lever to open the outlet port while closing the by-pass port and alternately to close outlet port while opening the by-pass port, the control means including a bearing plate rotatably carrying a manually shiftable lever with an adjustable stop for the valve element in an outlet port open position there being a control cable extending between the by-pass valve and remote control means and including a casing anchored to the by-pass valve and control means respectively and a reciprocable element free to shift therein and coupled to each of the aforesaid levers, whereby variations in pressure-volume are compensated for in the by-pass valve through preset manual adjustment of said control means therefor.

2. The by-pass and shut-off valve and remote adjustable control as set forth in claim 1, wherein the by-pass valve has a body with an arm projecting diagonally therefrom with respect to and bisecting the angular displacement of the first mentioned lever of said valve, there being an anchor on the arm and the casing of the control cable secured thereto spaced from the rotating axis of the valve lever and the reciprocable element extending therefrom and coupled to the valve lever to position the same.

3. The by-pass and shut-off valve and remote adjustable control as set forth in claim 1, wherein the control means bearing plate has an anchor and the casing of the control cable secured thereto spaced from the rotating axis of the control lever and the reciprocable element extending therefrom and coupled to the control lever to be positioned thereby.

4. The by-pass and shut-off valve and remote adjustable control as set forth in claim 1, wherein the control means bearing plate has an anchor and the casing of the control cable secured thereto spaced from the rotating axis of the control lever and the reciprocable element extending therefrom and coupled to the control lever to be positioned thereby, and wherein the by-pass valve has a body with an arm projecting diagonally therefrom with respect to and bisecting the angular displacement of the first mentioned lever of said valve, there being an anchor on the arm and the casing of the control cable secured thereto spaced from the rotating axis of the valve lever and the reciprocable element extending therefrom and coupled to the valve lever to position the same.

5. The by-pass and shut-off valve and remote adjustable control as set forth in any one of claims 1, 2 or 3, wherein the reciprocable element comprises a rod projecting from the control cable casing for push and pull movement of the lever.

6. The by-pass and shut-off valve and remote adjustable control as set forth in claim 1, wherein the reciprocable element comprises opposite end rods projecting from the control cable casing for push and pull movements between the control means lever and by-pass valve lever.

7. The by-pass and shut-off valve and remote adjustable control as set forth in any one of claims 1, 3 or 4, wherein the reciprocable element comprises a rod projecting from the control cable casing for push and pull movement of the control means lever into stopped engagement with the adjustable stop therefor comprised of a manually rotatable screw in opposition to the outlet port opening position of the lever.

8. The by-pass and shut-off valve and remote adjustable control as set forth in any one of claims 1, 3 or 4, wherein the reciprocable element comprises a rod projecting from the control cable casing for push and pull movement of the control means lever into stopped engagement with the adjustable stop therefor comprised of a manually rotatable screw and lock nut therefor and in opposition to the outlet port opening position of the lever.

* * * * *